US012714124B2

(12) United States Patent
Sagi et al.

(10) Patent No.: US 12,714,124 B2
(45) Date of Patent: Aug. 25, 2026

(54) SYSTEM FOR OBTAINING AN AESTHETICAL EFFECT OF A COOLED EDIBLE PRODUCT

(71) Applicant: SOLO GELATO LTD., Hila (IL)

(72) Inventors: Ben Sagi, Ramat Gan (IL); Barak Beth Halachmi, Hila (IL)

(73) Assignee: SOLO GELATO LTD., Hila (IL)

( * ) Notice: Subject to any disclaimer, the term of this patent is extended or adjusted under 35 U.S.C. 154(b) by 0 days.

(21) Appl. No.: 19/141,411

(22) PCT Filed: Dec. 12, 2023

(86) PCT No.: PCT/IL2023/051262

§ 371 (c)(1),
(2) Date: Jun. 20, 2025

(87) PCT Pub. No.: WO2024/134645

PCT Pub. Date: Jun. 27, 2024

(65) Prior Publication Data

US 2026/0114470 A1 Apr. 30, 2026

(30) Foreign Application Priority Data

Dec. 20, 2022 (IL) ........................................ 299304

(51) Int. Cl.
*A23G 9/28* (2006.01)
*A23G 9/22* (2006.01)

(52) U.S. Cl.
CPC ............ *A23G 9/228* (2013.01); *A23G 9/288* (2013.01)

(58) Field of Classification Search
CPC ................................ A23G 9/228; A23G 9/288
See application file for complete search history.

(56) References Cited

U.S. PATENT DOCUMENTS 4,048,473 A * 9/1977 Burkhart .............. A47J 27/004 219/521
5,444,992 A * 8/1995 Bell ......................... F25D 3/08 62/530
11,796,550 B2 * 10/2023 Fujii ................... G01N 35/025
2007/0267087 A1 11/2007 Jones et al.
(Continued)

FOREIGN PATENT DOCUMENTS

AU 2023409959 A1 * 7/2025 ............. A23G 9/228
CN 1050980 A * 5/1991 ............. A47J 36/36
(Continued)

OTHER PUBLICATIONS

The International Search Report and Written Opinion dated Feb. 16, 2024 in the corresponding International Application No. PCT/IL2023/051262.

*Primary Examiner* — Paul R Durand
*Assistant Examiner* — Bob Zadeh
(74) *Attorney, Agent, or Firm* — Tarolli, Sundheim, Covell & Tummino LLP

(57) ABSTRACT

The present disclosure concerns systems for dispensing of a cooled edible product from a preparation appliance, configured to displace a serving container vis-à-vis a dispensing nozzle in a displacement path depending on one or more product parameters and/or serving vessel parameters to obtain a repeatable aesthetic effect of a dispensed edible product.

17 Claims, 4 Drawing Sheets

(56) References Cited

U.S. PATENT DOCUMENTS

| | | | | |
|---|---|---|---|---|
| 2008/0257168 | A1* | 10/2008 | Wolfe | A47J 27/004<br>99/348 |
| 2012/0305595 | A1* | 12/2012 | Braun | B67D 3/0067<br>222/105 |
| 2016/0242434 | A1 | 8/2016 | Jones et al. | |
| 2018/0368440 | A1* | 12/2018 | Cocchi | A23G 9/288 |
| 2019/0053513 | A1* | 2/2019 | Beth Halachmi | A23G 9/00 |

FOREIGN PATENT DOCUMENTS

| | | | | | |
|---|---|---|---|---|---|
| EP | 3417716 | B1 | | 8/2020 | |
| JP | 2613815 | B2 | * | 5/1997 | |
| JP | 2015044173 | A | * | 3/2015 | B29B 7/106 |
| JP | 2020090318 | A | * | 6/2020 | |
| WO | 2013121421 | A1 | | 8/2013 | |
| WO | 2015022678 | A1 | | 2/2015 | |
| WO | 2024134645 | A1 | | 6/2024 | |

* cited by examiner

SYSTEM FOR OBTAINING AN AESTHETICAL EFFECT OF A COOLED EDIBLE PRODUCT

RELATED APPLICATIONS

This application is a U.S. National Stage Application filed under 35 USC 371, claiming priority to Serial No. PCT/IL2023/051262 filed on 12 Dec. 2023, which claims priority to Israeli Application No. 299304 filed 20 Dec. 2022 the entireties of which are incorporated herein by reference.

TECHNOLOGICAL FIELD

The present disclosure concerns dispensing of a cooled edible product from a preparation appliance. More specifically, the disclosure concerns a system for obtaining aesthetic serving of a dispensed edible product.

BACKGROUND ART

References considered to be relevant as background to the presently disclosed subject matter are listed below:

US 2018368440

WO2013121421

WO2015022678

Acknowledgement of the above references herein is not to be inferred as meaning that these are in any way relevant to the patentability of the presently disclosed subject matter.

BACKGROUND

Various appliances for preparing cooled edible products, such as ice-creams, gelato, sorbets, slushies, etc. are known. Typically, such appliances comprise a reservoir that holds a bulk quantity of cooled edible product, from which metered amounts are dosed and dispensed according to user demand. Other appliances comprise bulk reservoirs of raw ingredients, and upon user demand, a defined quantity of product is prepared and then dispensed. Yet other appliances utilize a pre-metered container, e.g. a capsule, that contains a defined amount of ingredients for the preparation of a single serving of product; the container is fed into the appliance for preparing the product, which is then dispensed from the appliance.

Typically, the final product is dispensed from the appliance into a serving container or vessel via a dispensing nozzle. While the nozzle itself can be designed to provide an aesthetic effect to the dispensed product, e.g. a shaped nozzle, often the uniformity and eye-pleasing effect of the dispensed product during its dispensing (and after it is dispensed into the container) will depend on various parameters thereof, for example viscosity, fluidity, consistency, temperature, etc. Hence, various recipes and preparation conditions/parameters will result in different physical properties of the product that have an effect on its dispensing from the appliance and the visual appearance of the dispensed product. While simple mechanisms for rotation or vertical displacement of the serving cup were suggested, such are often pre-programed and limited in their movement degrees of freedom, and are not easily customizable to products having a wide range of possible consistencies.

GENERAL DESCRIPTION

The present disclosure provides a system that can receive a serving container, e.g. a cup, a glass, a cone, etc., and provide relative displacement of the serving container with respect to the nozzle along a combination of movement directions during dispensing of the cooled edible product from the appliance. According to the present disclosure, the combined relative movement of the serving container vis-à-vis the nozzle can be carried out along a combination of movement directions, and is determined according to various physical parameters of the dispensed product and the serving container, such that an aesthetic effect and repeatable pattern can be obtained. The system of the present disclosure provide for automatic determination of the movement pattern of the serving container vis-à-vis the dispensing nozzle according to one or more of data concerning the prepared product by an ingredients' container fed into the appliance, provided by the user, derived from production parameters, measured or detected properties of the product, or any combination thereof.

The term cooled edible product means to denote any food product that is designed for consumption at low temperatures and is at least partially flowable at such temperatures. A cooled edible product can be, for example, ice cream, soft-serve ice cream, gelato, sorbet, frozen yogurt, frozen drinks, slushies, granita, sherbet, flavored ices, etc.

By a first aspect of this disclosure, there is provided a system for displacing a serving container below and with respect to a dispensing nozzle of a cooled edible product preparation appliance, the system is configured for data communication with said preparation appliance. The system comprises a displaceable base for receiving at least one serving container, the displaceable base being configured to be displaceable in a displacement pattern that consists of a combination of displacements along two or more of a vertical axis perpendicular to the displaceable base, a plane of the displaceable base, a tilt angle with respect to the plane of the displaceable base, and rotation about the vertical axis; two or more displacement means associated with said displaceable base for displacing said displaceable base along said displacement pattern; and a control module configured to receive one or more product parameters of the cooled edible product from the preparation appliance and determine the displacement pattern according to said data, the control module being configured to operate said two or more displacement means.

By another aspect, the disclosure provides a system for displacing a serving container below and with respect to a dispensing nozzle of a cooled edible product preparation appliance, the system being configured for data communication with said preparation appliance, and comprises a displaceable base for receiving at least one serving container, the displaceable base being configured to be displaceable in a displacement pattern that consists of a combination of displacements along two or more of a vertical axis perpendicular to the displaceable base, a plane of the displaceable base, a tilt angle with respect to the plane of the displaceable base and rotation about the vertical axis; two or more displacement means associated with said displaceable base for displacing said displaceable base along said displacement pattern; and a control module configured to receive one or more serving container parameters and determine the displacement pattern according to a combination of said serving container parameters and one or more product parameters of the cooled edible product, the control module being configured to operate said two or more displacement means.

In the systems of the present disclosure, a displaceable base is provided, and configured to receive and securely hold a serving container, into which the cooled edible product will be dispensed from the appliance. The base is displaceable, by two or more displacement means, e.g. electric motors, to displace in a displacement pattern, hence displacing the serving container therewith, with respect to the product dispensing nozzle of the appliance, such that an aesthetically pleasing shape of the cooled edible product is formed in the serving container.

The displacement pattern is determined by the control module of the system based on one or more product parameters of the cooled edible product and/or one or more parameters of the serving container.

As the physical properties of the cooled edible product produced by the appliance can significantly vary from one type of product to another, dispensing such products through the nozzle of the appliance can result in various unpleasing visual appearances, as well as inconsistent, inhomogeneous or non-repeatable filling of the serving container. For example, the physical properties of soft-serve ice cream will significantly differ from those of a sorbet, from those of frozen drinks (such as iced coffee), or from any other type of cooled edible product. When dispensing the cooled edible product from the nozzle, such physical differences result in different self-arrangement of the product within the serving container, depending, for example, on the consistency, physical stability, viscosity, temperature, etc. of the product. The system is configured to receive and/or obtain/acquire one or more physical parameters of the cooled edible product, and based on these parameters, determine the displacement pattern of the displaceable base that will result in optimal filling of the serving container, while obtaining a consistent, visually pleasing, aesthetic arrangement of the product in the serving container.

Further, as various containers, e.g. having different volumes or shapes, can be used as vessels into which the cooled edible product is dispensed, the system is configured to receive or acquire one or more parameters of the serving container, and based on these parameters (typically, albeit not exclusively, in combination with the one or more product parameters), determine the displacement pattern of the displaceable base that will result in optimal filling of the serving container, while obtaining said consistent aesthetic arrangement.

The displacement pattern consists of a combination of displacements along two or more displacement directions, typically along three or more displacement directions, depending on the product parameters and the desired visual effect. The displacement directions include vertical movement, i.e. vertically distanced movement closer and farther from the dispensing nozzle, along a vertical axis perpendicular to the plane defined by the displaceable base; lateral movement along the plane defined by the displaceable base; a tilting displacement, tilting the displaceable base (or the container) to one or more angles defined with respect to the plane of the displaceable base (the plane being defined when the base is at rest position); and a rotational displacement about the vertical axis. The extent of movement in each direction, the combination of directions and the sequence of movement is determined by the control module according to the product and/or serving container parameters, and resulting in the displacement pattern.

The term product parameter is meant to denote a physical property of the cooled edible product, for example composition, consistency, flowability, viscosity, temperature, etc. The term also means to refer to one or more measured values, for example measured or acquired by the appliance, that are indicative of the one or more product parameters. For example, measurement of the resistance of the blades in the processing chamber of the appliance is typically indicative of the viscosity of the product; hence, such a measured value is indicative of a product parameter. The term also means to encompass parameters obtained by indirect means, for example, texture or flowability of the cooled edible product assessed from visual imaging or processing of a visual feed (for example image processing of live camera feed of the product within the appliance or while flowing through the nozzle).

The one or more product parameters can be provided to the control module from various sources. By some embodiments, the control module is configured to receive at least one of: (a) coded data carried by an ingredients' container that is configured for feeding into the appliance, said coded data being indicative of said one or more product parameters, (b) one or more product parameters provided by the user through a user-interface of the appliance and/or system, (c) one or more measured values, measured by the appliance, said one or more measured values being indicative of said one or more product parameters, and (d) one or more visual inputs of said cooled edible product.

According to some embodiments, the ingredients' container is a bulk container holding ingredients for preparation of multiple servings of the cooled edible product. According to other embodiments, the ingredients' container is a pod or a capsule, holding ingredients in an amount for the preparation of only a single serving of said cooled edible product. The ingredients' container is fed into the appliance when the preparation of the cooled edible product is desired; the appliance is configured to acquire and transmit the product parameters decoded from the coded data on the ingredients' container, thereby inducing the system to operation according to the product parameters. As each product is different, depending on the product parameters, the data decoded from the ingredients' container can be unique to the specific ingredients (which can vary significantly from one product to the other), or to the desired final product to be produced therefrom (i.e. different products produced out of the same ingredients), permitting exact tailoring of the displacement pattern to the specific product produced.

The displaceable base is configured to receive one or more serving containers. The serving container is a vessel, typically having a top opening through which the cooled edible product can be received therein and extracted therefrom. The serving container can have any desired geometry, shape or size. While the serving vessel can have a volume suitable to hold a plurality of serving portions of the cooled edible product, preferably the serving container has a volume which is slightly larger than the volume of a single serving amount of the cooled edible product. For example, a single serving of ice cream or gelato can be a volume of 50-250 ml, while a single serving of a frozen drink or a slushy can be 200-1,000 ml. Serving containers can include, for example, cups, cons, bowls, glasses (e.g. drinking glass, goblets, flute glasses, balloon glasses, wine glasses, tumblers, shot glasses, etc.), or any other container suitable for serving a cooled edible product. The serving container can be made of any suitable material, e.g. paper, plastic, glass, metal, ceramics, edible composition (e.g. waffle or biscuit), etc.

According to some embodiments, the displaceable base is configured to receive a single serving container. By some other embodiments, the displaceable base is configured to receive a plurality of serving containers, and the displacement pattern is configured to displace the displaceable base to enable sequential (i.e. serial) filling of the serving containers. In such embodiments, the control module of the system also receives data from the appliance concerning the sequence of dispensing and timing of operation of the nozzle to permit a sequence of dispensing operations to sequentially fill the serving containers. When receiving a plurality of containers, the containers can be the same or different from one another.

By some embodiments, the control module is configured to receive one or more serving container parameters, either from a user or from one or more acquiring means of the system. The serving container parameter(s) refers to one or more physical properties of the serving container; for example, shape, volume, material, dimensions, etc.

According to some embodiments, the control module is configured to determine the displacement pattern according to a combination of said one or more product parameters and said one or more serving container parameters. In other words, as the displaceable base can be configured to accommodate various shapes and volumes of serving containers, in such cases the displacement patterns can be determined not only based on the product parameters, but also as a function of one or more parameters of the serving container.

By some embodiments, the serving container parameters are provided to the control module by the use via a user interface of the appliance or the system. According to some other embodiments, the system comprises one or more container sensors, configured to acquire said one or more container parameters and communicating said container parameters to said control module. According to other embodiments, the serving container can comprise one or more identification means, e.g. an RFID tag, a barcode, a QR code, etc. and the appliance can comprise a suitable reader utility, thereby permitting acquiring and transfer of the one or more serving container parameters to the control module.

According to some embodiments, the control module is configured to provide a user of the appliance with a recommendation of the geometry, size or shape of the serving container based on said one or more product parameters. Namely, once acquiring the product parameters, the control module can issue a recommendation, provided to the user via a user interface, concerning the recommended serving container for the specific produced cooled edible product in order to obtain optimal repeatability and aesthetic effect.

The displaceable base can, by some embodiments, comprise at least one serving container holding device, for removably receiving the one or more serving containers. The serving container holding device can have a pre-defined form that is suitable for holding specific types and/or configurations of serving containers.

Alternatively, the serving container holding device can be configurable to receive serving containers of various geometries, shapes or sizes, and securely hold the serving container during displacement of the displaceable base. In such embodiments, the control module is configured to receive one or more serving container parameters and configure the container holding device to securely receive the serving container according to said one or more container parameters.

Depending on the described effect and the cooled edible product produced, it is sometimes desirable that the serving container will be cooled. Thus, in some embodiments, the displaceable base comprises or is associated with a cooling unit, and configured to cool the serving container. The control module can be associated with the cooling unit, and configured to operate the cooling unit to cool the serving container to a defined temperature according to said one or more product parameters. Alternatively, the control module can be configured to issue a recommendation to the user, via a user interface, recommending the use of a cooled/chilled serving container according to the product parameters.

By some embodiments, the system is configured for detachable attachment to a cooled edible product preparation appliance. By some other embodiments, the system is an integral system of a cooled edible product preparation appliance (i.e. integrally formed with the appliance).

At times, addition of one or more toppings (liquid or solid) is desired, for example during dispensing of the cooled edible product (for example to form a layered effect) or on top of the product after dispensing into the serving container. By some embodiments, the control module is configured to receive one or more topping parameters, which can be part of the product parameters or in addition to the product parameters, and determine the displacement patterns according thereto.

By some embodiments, the appliance with which the system is configured to communicate permits concomitant preparation of two or more different cooled edible products in the same appliance, each dispensed from a designated dispensing nozzle. In such cases, the product parameters also include data about the relevant dispensing nozzle from which the product will be dispensed, and the displacement pattern is also calculated based on the location of the nozzle from which the product will be dispensed.

In other possible configurations, the appliance can comprise two or more nozzles, each designed to dispense a different cooled edible product, however the different products are designed for joint consumption (e.g. one nozzle dispensing one flavor of ice cream and the other a different flavor of ice cream). In such cases, the product parameters also include data about the sequence of dispensing of cooled edible product out of each nozzle, and displacement pattern is also calculated based on such data. By some embodiments, the control module can communicate with the appliance in order to time a sequence of dispensing through the nozzles, such that different aesthetic effects can be obtained based on the displacement pattern.

The system, as noted is linkable or is linked to the appliance to established data communication therebetween. The system can also be linked to the appliance to receive one or more utilities from the appliance, e.g. electricity or cooling.

By another aspect of this disclosure, there is provided an appliance for preparing a cooled edible product from ingredients and dispensing of said product, the appliance comprising:

- a cooled processing chamber, configured to receive said ingredients and process said ingredients therein to obtain said cooled edible product;
- a cooling utility for cooling said processing chamber;
- a dispensing nozzle associated with said chamber and configured for dispensing said cooled edible product from the processing chamber; and
- a system as described herein, configured to position at least one serving container vertically below the dispensing nozzle and displace the displaceable base according to said displacement pattern during dispensing of the cooled edible product from through the dispensing nozzle.

According to some embodiments, the appliance is configured to receive a capsule or a pod containing ingredients for preparation of said cooled edible product, and to transfer said ingredients from the capsule or pod into the cooled processing chamber. The capsule or pod can contain part of the ingredients required to prepare a single serving of the cooled edible product, however preferably the capsule or pod contains all of the ingredients required for preparation of a single serving of said cooled edible product by the appliance. In other words, the appliance is configured to receive and process pods or capsules containing ingredients in a volume/amount for preparation of a single serving of cooled edible product from the entire content of the pod or capsule.

By some embodiments, the appliance further comprises data acquiring and processing means, e.g. a data processing utility, that is configured to acquire and process coded data carried by the capsule or pod, said coded data being processes into one or more product parameters which are communicated to the displacing system.

Yet another aspect of this disclosure provides a method of dispensing a cooled edible product from an appliance as disclosed herein, the method comprising dispensing the cooled edible product through the dispensing nozzle, while simultaneously displacing said displaceable base according to said displacement pattern to obtain a desired shape of the cooled edible product in the serving container.

Throughout this specification, unless the context requires otherwise, the word "comprise", and variations such as "comprises" and "comprising", will be understood to imply the inclusion of a stated integer or step or group of integers or steps but not the exclusion of any integer or step or group of integers and steps.

Generally it is noted that the term " . . . at least one . . . " as applied to any component of the system, appliance or method of this disclosure should be read to encompass one, two, three, four, or more different occurrences of said component.

It is appreciated that certain features of this disclosure, which are, for clarity, described in the context of separate embodiments, may also be provided in combination in a single embodiment. Conversely, various features which are, for brevity, described in the context of a single embodiment, may also be provided separately or in any suitable sub-combination or as suitable in any other described embodiment of this disclosure. Certain features described in the context of various embodiments are not to be considered essential features of those embodiments, unless the embodiment is inoperative without those elements.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Attention is first drawn to FIGS. 1A-1D, showing a system 100 that can receive a serving container (as can be seen in FIGS. 5A-5F), and displacing it relative to a dispensing nozzle 202 of a cooled edible product preparation appliance 200 during dispensing of a cooled edible product therefrom. The combination of movement directions of the displaceable base (to be described below) during dispensing of the cooled edible product, results in an aesthetic effect and robust and/or repeatable arrangement of the cooled edible product within the serving container. The combined relative movement of the serving container vis-à-vis the nozzle is carried out along a combination of movement directions, shown in FIGS. 1A-1D, and is determined according to various physical parameters of the dispensed product and/or the serving container. In other words, the system provides for automatic determination of the movement pattern of the serving container vis-à-vis the dispensing nozzle according to data concerning the prepared product provided by the user, provided by an ingredients' container fed into the appliance, production parameters, measured properties of the product, one or more serving container parameters, or a combination thereof.

Figure 1A:
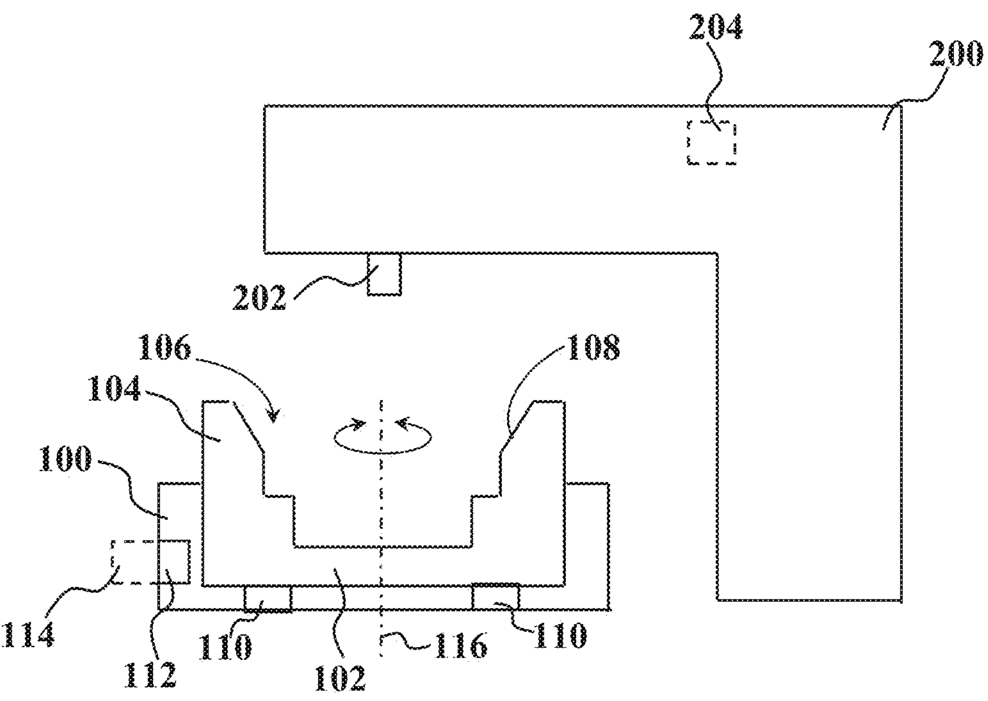
FIGS. 1A-1D are schematic representations of a system according to an embodiment of this disclosure, showing the various movement directions of the displaceable base with respect to a dispensing nozzle of an appliance for the production of a cooled edible product.
Figure 1B:
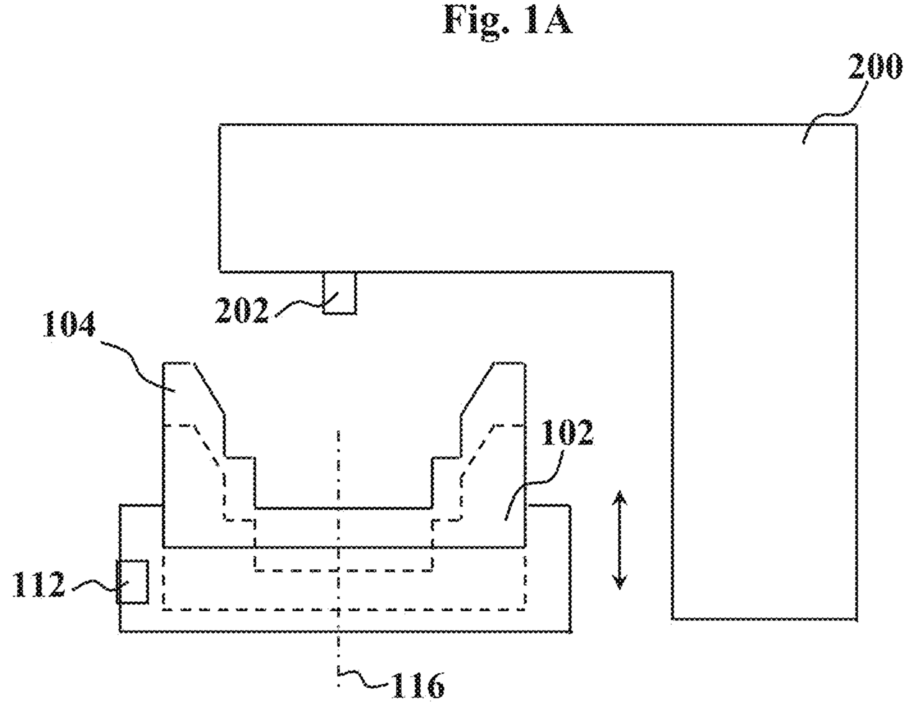
Figure 1C:
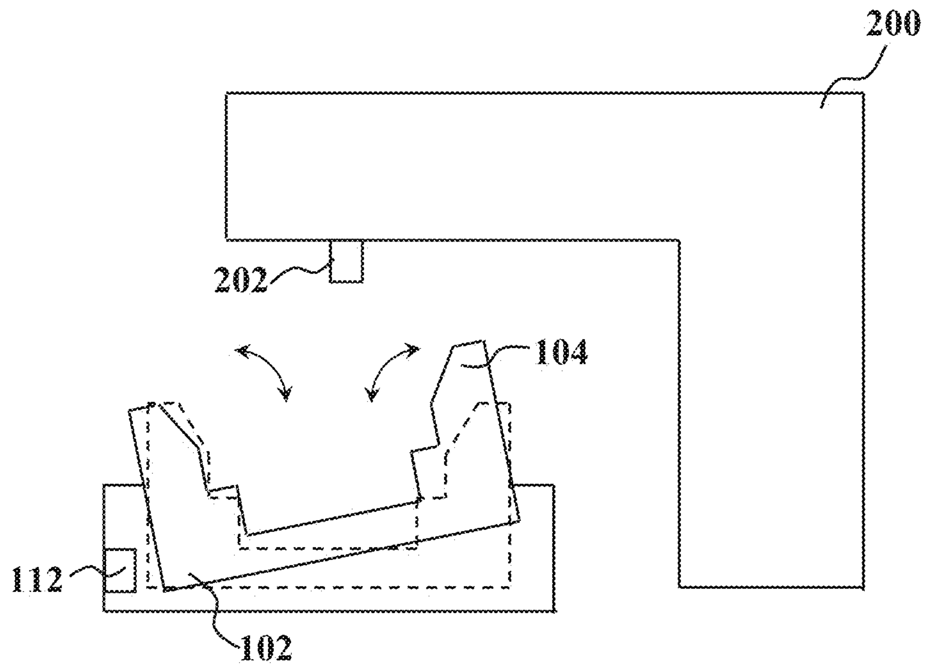
Figure 1D:
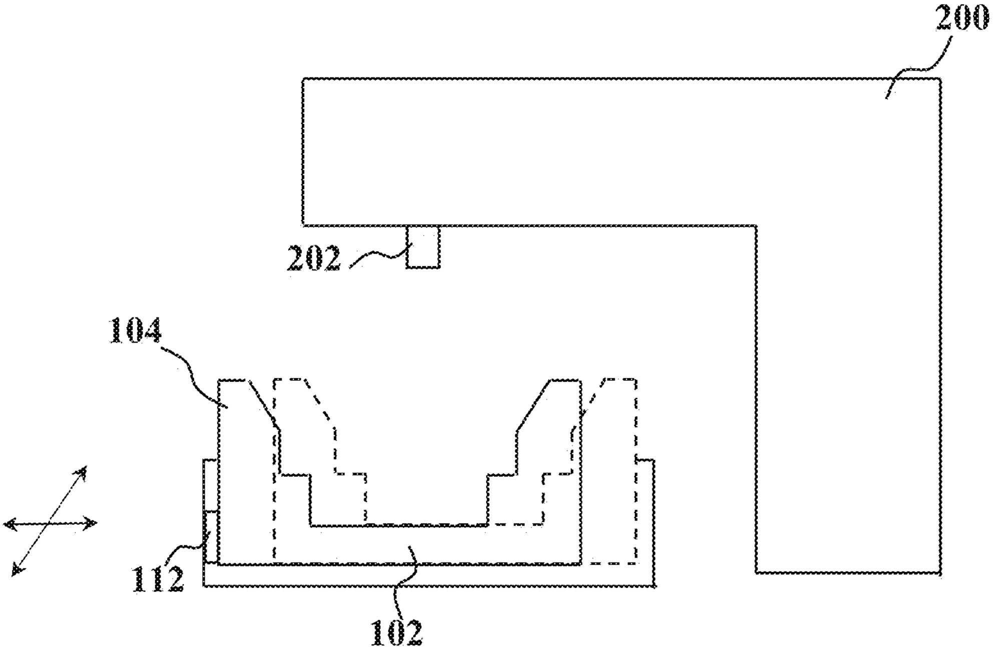

System 100 comprises a displaceable base 102 for receiving at least one serving container (see, for example, FIGS. 5A-5F). In the exemplified system, the displaceable base 102 includes a serving container holding device 104 that is configured to be displaceable by the displaceable base 102 along a displacement pattern that combines displacement in at least two displacement directions, typically three or more displacement directions, that include rotational displacement about a vertical axis 116 of the system (FIG. 1A), linear displacement along the vertical axis 116 (FIG. 1B), a tilt angle with respect to the plane of the displaceable base (FIG. 1C), and lateral displacement in a plane of the displaceable base (FIG. 1D).

Movement along the various displacement directions is enabled by two or more displacement means (schematically represented 110, seen in FIG. 1A) associated with the displaceable base, e.g. electric motors, hydraulic or pneumatic systems, etc.

Control module 112 is configured to receive one or more product parameters of the cooled edible product from the preparation appliance 200 and determine the displacement pattern according to the received data, and is configured to operate the displacement means to displace the displaceable base in the displacement pattern according to the received data. The extent of movement in each displacement direction, the combination of directions, and the sequence of movement, is determined by the control module according to the product parameters and resulting in the displacement pattern.

The product parameters can be provided to the control module from various sources. Typically, the control module is configured to receive at least one of: (a) coded data carried by an ingredients' container (not shown) that is configured for feeding into the appliance, the coded data being indicative of the product parameters, (b) one or more product parameters provided by the user through a user-interface 204, 114 of the appliance or system, respectively, (c) one or more measured values, measured by the appliance, the one or more measured values being indicative of the product parameters, and/or (d) one or more visual inputs of said cooled edible product.

Exemplary, non-limiting, product parameters of the cooled edible product are composition, consistency, flowability, viscosity, temperature, etc.; as well as one or more measured values that are indicative of the product parameters, for example measurement of the resistance of the blades in the processing chamber of the appliance is typically indicative of the viscosity of the product.

In one example, the cooled edible product is produced from ingredients held in a bulk container (not shown) and suitable for preparation of multiple servings of the cooled edible product. By another example, the ingredients' container can be a pod or a capsule (not shown), that holds ingredients in an amount for the preparation of a single serving of said cooled edible product, and configured for feeding into the appliance when the preparation of the cooled edible product is desired. In both cases, the appliance can be configured to acquire and transmit the product parameters decoded from coded data on the ingredients' container, thereby inducing the system into operation according to the product parameters. As each product is different, depending on the product parameters, the data decoded from the ingredients' container can be unique to the specific ingredients (which can vary significantly from one product to the other), permitting exact tailoring of the displacement pattern to the specific product produced.

As noted, the serving container holding device 104 is configured to receive and securely hold at least one serving container. In the shown example, device 104 has a receiving cavity 106 defined by shaped circumferential walls 108. Preferably, walls 108 are shaped to removably receive a variety of serving containers 302, 304, 306, 308, 310, 312, 314, as seen, for example in FIGS. 5A-5F, respectively. However, it is also contemplated that the serving container holding device can be designed to hold a specific type and/or configuration of a defined serving container. The serving container can have any desired geometry, shape or size suitable for holding by the serving container holding device 104. While the serving vessel can have a volume suitable to hold a plurality of serving portions of the cooled edible product, preferably the serving container has a volume which is slightly larger than the volume of a single serving amount of the cooled edible product.

The control module can be configurable to receive one or more serving container parameters, e.g. shape, volume, material, dimensions, etc., and determine the displacement pattern based on a combination of the product parameters and the serving container parameters. In other words, as the displaceable base can be configured to accommodate various shapes and volumes of serving containers, in such cases the displacement patterns will be determined not only based on the product parameters, but also as a function of one or more parameters of the serving container.

Figures 4, 5A, 5B, 5C, 5D, 5E, 5F:
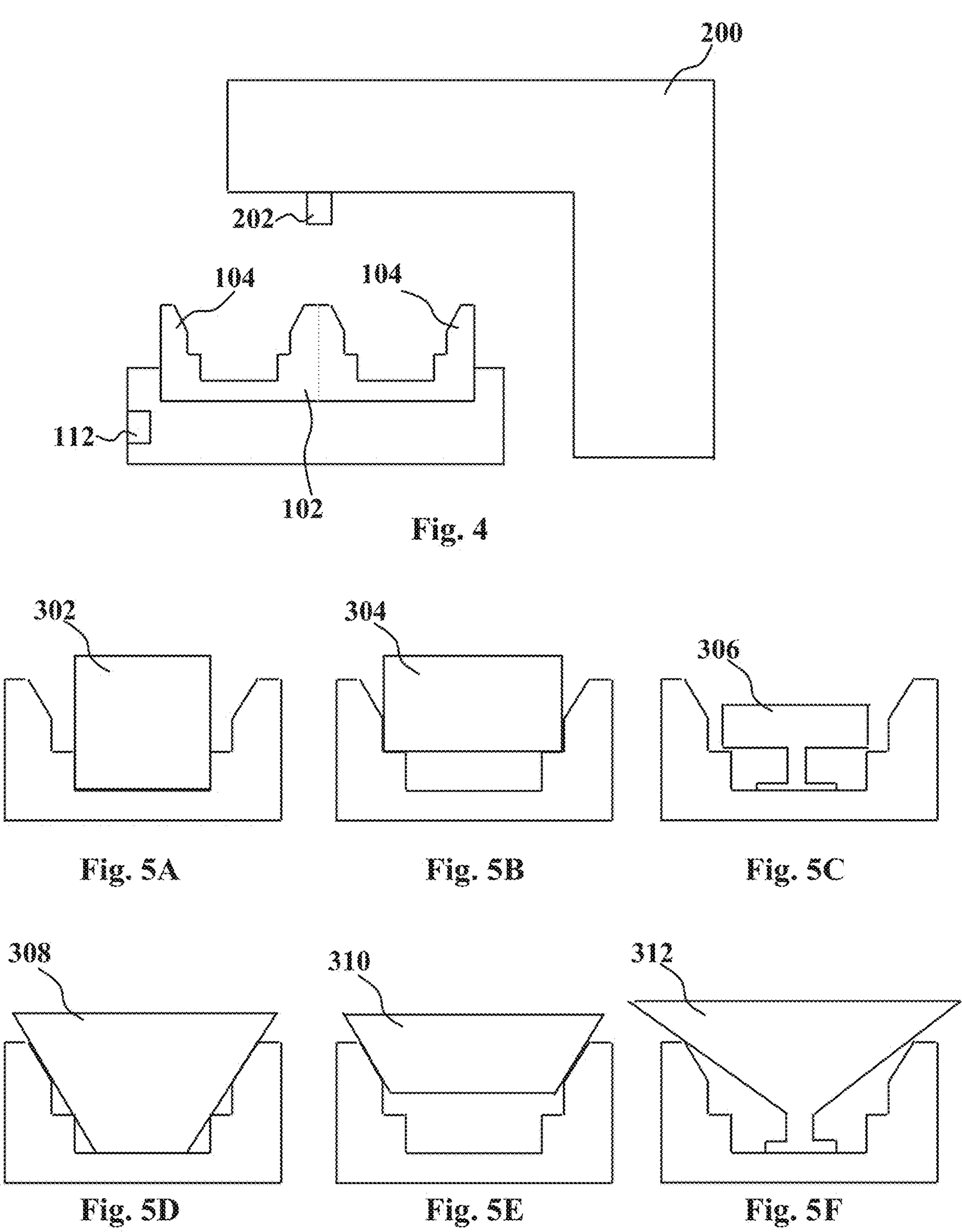
FIG. 4 is a schematic representation of a system according to another embodiment of this disclosure, showing a displaceable base configured to receive more than one serving container.
FIGS. 5A-5F are schematic representation of a system, showing various exemplary serving containers receivable in the displaceable base.

The displaceable base can be configured to receive a plurality of serving containers, as shown in FIG. 4. In such cases, the displacement pattern is typically configured to displace the displaceable base to enable sequential filling of the serving containers. The control module 112 of the system can also receive data from the appliance 200 concerning the sequence of dispensing and timing of operation of the nozzle 202 to permit a sequence of dispensing operations to sequentially fill the serving containers. When receiving a plurality of containers, the containers can be the same or different from one another.

Figure 3:
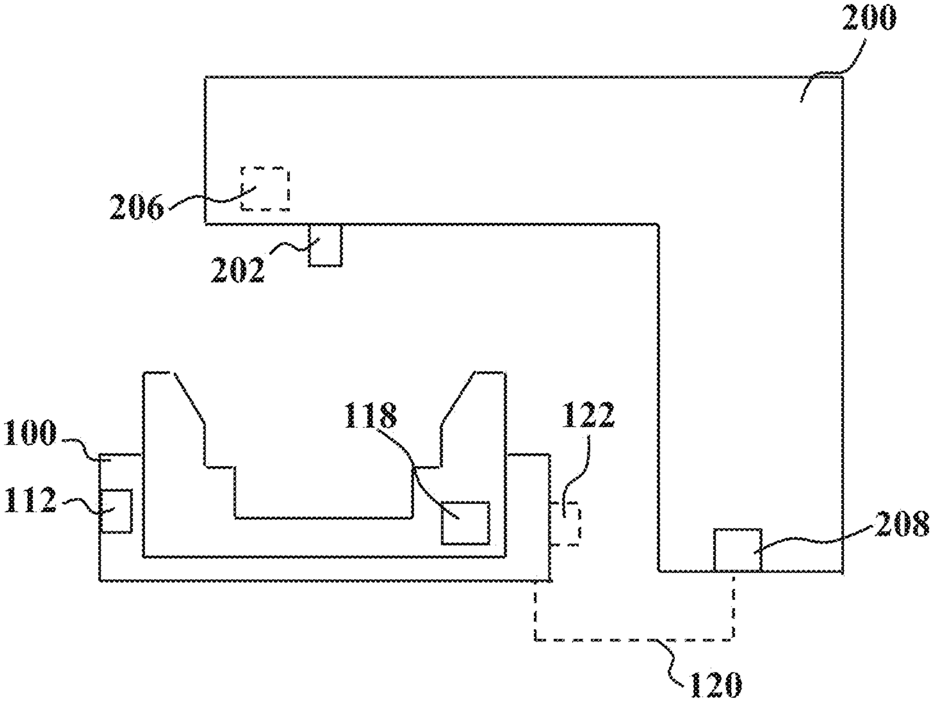
FIG. 3 is a schematic representation of a system according to another embodiment of this disclosure, with the system being in fluid communication with the appliance.

As seen in FIG. 3, system 100 can comprise one or more serving container sensors 118, configured to acquire one or more container parameters from the serving container and communicating the container parameters to control module 112. Additional sensors and/or means 206 can be included in the appliance 200 to acquire various spatial parameters of the serving container or the serving container holding device 104 during their movement along the displacement pattern, and transmit the acquired data to the system's control module 112. Such spatial parameters can be used as a verification and control means to verify the proper relative displacement of the displaceable base 102 with respect to nozzle 202, and/or indicate the status of filling of the container. For example, means 206 can be one or more cameras that can acquire images of the serving container prior to dispensing and/or of the cooled edible product during its dispensing. Alternatively, means 206 can be an RFID or barcode reader, configured to read and process a suitable RFID tag or a barcode provided on the serving container, thereby providing the control module of the appliance with said one or more serving container parameters.

Depending on the described effect and the cooled edible product produced, it is sometimes desirable that the serving container will be cooled. Therefore, the device can comprise or be associated with a cooling unit, and configured to cool the serving container. For example, system 100 can receive circulating cooling fluid from a cooling module 208 of appliance 200 through flow line 120 (FIG. 3). However, it is also contemplated that system 100 comprises an integral cooling module 122. The control module 112 can be associated with the cooling module 122 and/or 280, and configured to operate the cooling units to cool the serving container to a defined temperature according to said one or more product parameters.

At times, addition of one or more toppings (liquid or solid) is desired, for example during dispensing of the cooled edible product (for example to form a layered effect) or on top of the product after dispensing into the serving container. The control module 112 can be configured to receive one or more topping parameters, which can be part of the product parameters or in addition to the product parameters, and determine the displacement patterns according thereto.

Figure 2:
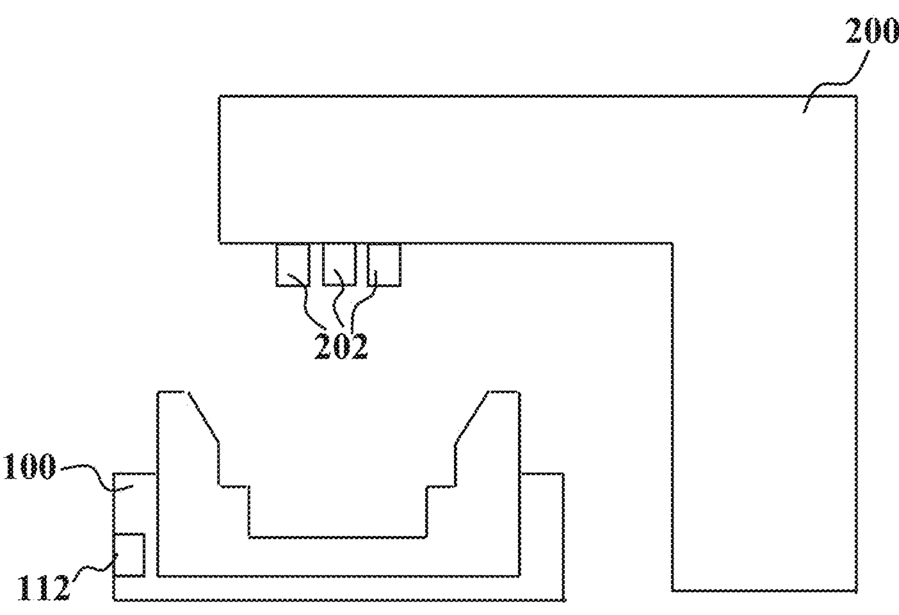
FIG. 2 is a schematic representation of a system according to another embodiment of this disclosure, in which the appliance comprises a plurality of dispensing nozzles.

Appliance 200 can permit, according to another example, preparation of two or more different cooled edible products, each dispensed from a designated dispensing nozzle 202, as seen in FIG. 2. In such cases, the product parameters also include data about the relevant dispensing nozzle from which the product will be dispensed, and the displacement pattern is also calculated based on the location of the nozzle from which the product will be dispensed.

Nozzles 202 in FIG. 2 can be designed to dispense a different cooled edible product each, however the different products are designed for joint consumption (e.g. one nozzle dispensing one flavor of ice cream and the other a different flavor of ice cream). In such cases, the product parameters also include data about the sequence of dispensing of cooled edible product out of each nozzle, and displacement pattern is also calculated based on such data. In such cases, the control module 112 can communicate with the appliance 200 in order to time a sequence of dispensing through the nozzles 202, such that different aesthetic effects can be obtained based on the displacement pattern.

The invention claimed is:

1. A system for displacing a serving container below and with respect to a dispensing nozzle of a cooled edible product preparation appliance, the system being configured for data communication with said preparation appliance, and comprises:

a displaceable base for receiving at least one serving container, the displaceable base being configured to be displaceable in a displacement pattern that consists of a combination of displacements along a vertical axis perpendicular to the displaceable base, a plane of the displaceable base, a tilt angle with respect to the plane of the displaceable base and rotation about the vertical axis;

two or more displacement means associated with said displaceable base for displacing said displaceable base along said displacement pattern; and a control module configured to receive one or more product parameters of the cooled edible product from the preparation appliance and determine the displacement pattern according to said data, the control module being configured to operate said two or more displacement means.

2. The system of claim 1, wherein said displacement pattern consists of a combination of displacements along said vertical axis, the plane of the displaceable base, said tilt angle, and said rotation about the vertical axis.

3. The system of claim 1, wherein said displaceable base is configured to receive the at least one serving containers of different geometries, shapes and/or volumes.

4. The system of claim 1, being configured for detachable attachment to a cooled edible product preparation appliance.

5. The system of claim 1, being an integral system of a cooled edible product preparation appliance.

6. The system claim 1, wherein said control module is configured to receive at least one of: (a) coded data carried by an ingredient container that is configured for feeding into the appliance, said coded data being indicative of said one or more product parameters, (b) said one or more product parameters provided by the user through a user-interface of the appliance or system, (c) one or more measured values, measured by the appliance, said one or more measured values being indicative of said one or more product parameters, and (d) one or more visual inputs of said cooled edible product.

7. The system of claim 1, wherein said control module is configured to receive one or more serving container parameters.

8. The system of claim 7, wherein said system comprises one or more container sensors, configured to acquire said one or more container parameters and communicating said container parameters to said control module.

9. The system of claim 7, wherein said system comprises a user interface for providing said one or more container parameters.

10. The system of claim 7, wherein the control module is configured to determine said displacement pattern according to a combination of said one or more product parameters and said one or more serving container parameters.

11. The system of claim 1, wherein said displaceable base comprises at least one serving container holding device, for removably receiving said at least one serving container.

12. The system of claim 11, wherein the serving container holding device is configurable to receive the at least one serving container of various geometries, shapes or sizes, and securely hold the at least one serving container during displacement of the displaceable base.

13. The system of claim 11, wherein said control module is configured to receive one or more serving container parameters and configure the container holding device to securely receive the at least one serving container according to said one or more container parameters.

14. The system of claim 1, wherein the control module is configured to provide a user of the appliance with a recommendation of the geometry, size or shape of the at least one serving container based on said one or more product parameters.

15. The system of claim 1, wherein said displaceable base comprises or is associated with a cooling unit, and configured to cool the at least one serving container.

16. The system of claim 15, wherein the control module is associated with the cooling unit, and configured to operate the cooling unit to cool the at least one serving container to a defined temperature according to said one or more product parameters.

17. An appliance for preparing the cooled edible product from ingredients and dispensing of said cooled edible product, the appliance comprising:

a cooled processing chamber, configured to receive said ingredients and process said ingredients therein to obtain said cooled edible product;

a cooling utility for cooling said processing chamber;

the dispensing nozzle associated with said chamber and configured for dispensing said cooled edible product from the processing chamber; and a system according to claim 1, configured to position the at least one serving container vertically below the dispensing nozzle and displace the displaceable base according to said displacement pattern during dispensing of the cooled edible product from through the dispensing nozzle.

* * * * *